(12) United States Patent
Zhan et al.

(10) Patent No.: US 11,531,926 B2
(45) Date of Patent: Dec. 20, 2022

(54) METHOD AND APPARATUS FOR GENERATING MACHINE LEARNING MODEL BY USING DISTRIBUTED COMPUTING FRAMEWORK

(71) Applicant: BAIDU ONLINE NETWORK TECHNOLOGY (BEIJING) CO., LTD., Beijing (CN)

(72) Inventors: Zhizheng Zhan, Beijing (CN); Zhiqiang Liu, Beijing (CN); Zhiyong Shen, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 1079 days.

(21) Appl. No.: 15/751,008

(22) PCT Filed: Jun. 20, 2016

(86) PCT No.: PCT/CN2016/086413
§ 371 (c)(1),
(2) Date: Feb. 7, 2018

(87) PCT Pub. No.: WO2017/166449
PCT Pub. Date: Oct. 5, 2017

(65) Prior Publication Data
US 2020/0090073 A1   Mar. 19, 2020

(30) Foreign Application Priority Data
Mar. 30, 2016 (CN) .................. 201610192139.X

(51) Int. Cl.
*G06N 20/00* (2019.01)
(52) U.S. Cl.
CPC .................. *G06N 20/00* (2019.01)

(58) Field of Classification Search
CPC ..................................................... G06N 20/00
See application file for complete search history.

(56) References Cited

U.S. PATENT DOCUMENTS

| | | | |
|---|---|---|---|
| 7,222,127 | B1 | 5/2007 | Bem et al. |
| 7,882,045 | B1 | 2/2011 | Cole et al. |

(Continued)

FOREIGN PATENT DOCUMENTS

| | | |
|---|---|---|
| CN | 1828575 A | 9/2006 |
| CN | 101127029 A | 2/2008 |

(Continued)

OTHER PUBLICATIONS

Kiran, M. et al. (2013). "Verification and validation of MapReduce program model for parallel support vector machine algorithm on Hadoop cluster". International Journal of Computer Science Issues (IJCSI), 10(3), 317. (Year: 2013).*

(Continued)

*Primary Examiner* — Lut Wong
(74) *Attorney, Agent, or Firm* — Lathrop GPM LLP

(57) ABSTRACT

This disclosure discloses a method and apparatus for generating a machine learning model. An embodiment of the method comprises: generating model parameter combinations, and generating machine learning models respectively corresponding to the model parameter combinations; dividing preset machine learning data into training data and validation data; training the machine learning models in parallel respectively based on the training data; validating a learning accuracy of the trained machine learning models respectively based on the validation data to obtain validation scores; determining an optimal model parameter combination corresponding to a machine learning model to be generated based on the validation scores, and generating a machine learning model corresponding to the optimal model parameter combination, thereby realizing training and vali- (Continued)

dation of the machine learning models respectively corresponding to the model parameter combinations in parallel, improving the whole parameter optimization process, and rapidly generating a desired machine learning model.

11 Claims, 4 Drawing Sheets

(56) References Cited

U.S. PATENT DOCUMENTS

| | | | |
|---|---|---|---|
| 9,104,655 B2* | 8/2015 | Kyaw | G06F 40/30 |
| 9,569,401 B2* | 2/2017 | Pechyony | G06N 20/00 |
| 11,182,691 B1* | 11/2021 | Zhang | G06N 20/00 |
| 2009/0125239 A1 | 5/2009 | Niemeyer et al. | |
| 2009/0306995 A1 | 12/2009 | Weng et al. | |
| 2014/0161362 A1* | 6/2014 | Cao | G06V 10/751 382/224 |
| 2022/0050695 A1* | 2/2022 | Gajendran | G06N 20/00 |

FOREIGN PATENT DOCUMENTS

| | | |
|---|---|---|
| CN | 102804156 A | 11/2012 |
| CN | 104300087 A | 1/2015 |
| CN | 104536979 A | 4/2015 |
| CN | 105335519 A | 2/2016 |
| EP | 2953066 A1 | 9/2015 |

OTHER PUBLICATIONS

Chandorkar, M. (2015). "Fixed size least squares support vector machines: A scala based programming framework for large scale classification". (Doctoral dissertation, Ph. D. diss., KU Leuven). (Year: 2015).*

Budgaga, W. (2014). "A framework for real-time, autonomous anomaly detection over voluminous time-series geospatial data streams". (Doctoral dissertation, Colorado State University). (Year: 2014).*

Yang, K. et al. (Oct. 2011). "Determining the repeat number of cross-validation". In 2011 4th International Conference on Biomedical Engineering and Informatics (BMEI) (vol. 3, pp. 1706-1710). IEEE. (Year: 2011).*

"10-fold Crossvalidation (Supervised Classification)", https://www.openml.org/a/estimation-procedures/1 as archived by the Wayback Machine at archive.org on Jan. 10, 2015 at 09:53:42. (Year: 2015).*

Sun, Y. et al. (2014). "A hadoop-based method to predict potential effective drug combination". BioMed research international, 2014. (Year: 2014).*

Cao, L. et al. (Nov. 2012). IBM Research and Columbia University TRECVID-2012 Multimedia Event Detection (MED), Multimedia Event Recounting (MER), and Semantic Indexing (SIN) Systems. In TRECVID. (Year: 2012).*

Chandorkar, M. et al. (Dec. 2015). "Fixed-size least squares support vector machines: Scala implementation for large scale classification". In 2015 IEEE Symposium Series on Computational Intelligence (pp. 522-528). IEEE. (Year: 2015).*

Jose, C. (2015). "Inquest: system to utilize perceptible information to affirm user identity on personal mobile devices". (Doctoral dissertation). (Year: 2015).*

Kumar, A. et al. (Jul. 2013). "Verification and validation of mapreduce program model for parallel k-means algorithm on hadoop cluster". In 2013 Fourth International Conference on Computing, Communications and Networking Technologies (ICCCNT) (pp. 1-8 ). IEEE. (Year: 2013).*

PCT/CN2016/086413 English translation of the International Search Report dated Jan. 6, 2017, 2 pages.

Li et al. "Analysis of Machine Learning Model Based on Support Vector Machine" Journal of Jishou University (Natural Science Edition), vol. 31 No. 3, May 2010, 4 pages.

Xiu et al. "Case-based learning modeling for goal programming", Journal of Harbin Institute of Technology, vol. 35 No. 1, Jan. 2003, 5 pages.

* cited by examiner

METHOD AND APPARATUS FOR GENERATING MACHINE LEARNING MODEL BY USING DISTRIBUTED COMPUTING FRAMEWORK

CROSS-REFERENCE TO RELATED APPLICATIONS

This application claims priority to Chinese Patent Application No. "201610192139.X" filed on Mar. 30, 2016, the entire contents of which are incorporated herein by reference.

TECHNICAL FIELD

This disclosure relates to the field of computer, specifically to the field of machine learning, and more specifically to a method and apparatus for generating a machine learning model.

BACKGROUND

Machine learning is a widely used artificial intelligence technology. When generating machine learning models, different equipped parameter combinations lead to different learning effects of the machine learning models. Therefore, the model parameters need to be optimized. At present, usually all model parameter combinations within a certain scope are searched according to a certain step length, and the machine learning models respectively corresponding to the model parameter combinations are trained and validated in order, that is, implementing training and validation in serial mode, and determining an optimal model parameter combination according to the validated results.

However, when measures are taken to determine an optimal model parameter combination of a machine learning model, the machine learning models respectively corresponding to the parameter combinations are trained and validated in serial mode. Because usually there are mass training and validation data, comparatively large expenses are paid for each training and validation process, thereby affecting the execution schedule of subsequent training and validation process of model parameter combinations, thus slowing down the whole model parameter optimization process, and leading to failure in obtaining a desired machine learning model in a relatively short time.

SUMMARY

This disclosure provides a method and apparatus for generating a machine learning model to solve the technical problems existing in the above background part.

On one hand, this disclosure provides a method for generating a machine learning model, including: generating model parameter combinations, and generating machine learning models respectively corresponding to the model parameter combinations, where the model parameters indicate an associated relationship between input vectors and output vectors of the machine learning models; executing a dividing operation: dividing preset machine learning data into training data and validation data; executing training and validation operations: training the machine learning models in parallel respectively based on the training data; validating a learning accuracy of the trained machine learning models respectively based on the validation data to obtain validation scores, where the validation scores indicate a ratio of consistency between data types corresponding to the output vectors output by the machine leaning models based on the validation data and types of the validation data; and executing a model generation operation: determining an optimal model parameter combination corresponding to a machine learning model to be generated based on the validation scores, and generating a machine learning model corresponding to the optimal model parameter combination.

On the other hand, this disclosure provides an apparatus for generating a machine learning model, including: a generation unit, configured to generate model parameter combinations, and generate machine learning models respectively corresponding to the model parameter combinations, where the model parameters indicate an associated relationship between input vectors and output vectors of the machine learning models; a division unit, configured to execute a dividing operation: dividing preset machine learning data into training data and validation data; a processing unit, configured to execute training and validation operations: training the machine learning models in parallel respectively based on the training data; and validating a learning accuracy of the trained machine learning models respectively based on the validation data to obtain validation scores, where the validation scores indicate a ratio of consistency between data types corresponding to the output vectors output by the machine leaning models based on the validation data and types of the validation data; and an execution unit, configured to execute a model generation operation: determining an optimal model parameter combination corresponding to a machine learning model to be generated based on the validation scores, and generating a machine learning model corresponding to the optimal model parameter combination.

The method and apparatus for generating a machine learning model provided by this disclosure generates model parameter combinations, and generates machine learning models respectively corresponding to the model parameter combinations; divides preset machine learning data into training data and validation data; trains the machine learning models in parallel respectively based on the training data; validates a learning accuracy of the trained machine learning models respectively based on the validation data to obtain validation scores; determines an optimal model parameter combination corresponding to a machine learning model to be generated based on the validation scores, and generates a machine learning model corresponding to the optimal model parameter combination, thereby realizing training and validation of the machine learning models respectively corresponding to the model parameter combinations in parallel, improving the whole parameter optimization process, and rapidly generating a desired machine learning model.

BRIEF DESCRIPTION OF THE DRAWINGS

By reading and referring to the detailed description of non-limiting embodiments provided in the accompanying drawings, other features, objects and advantages of the disclosure will become more clear.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
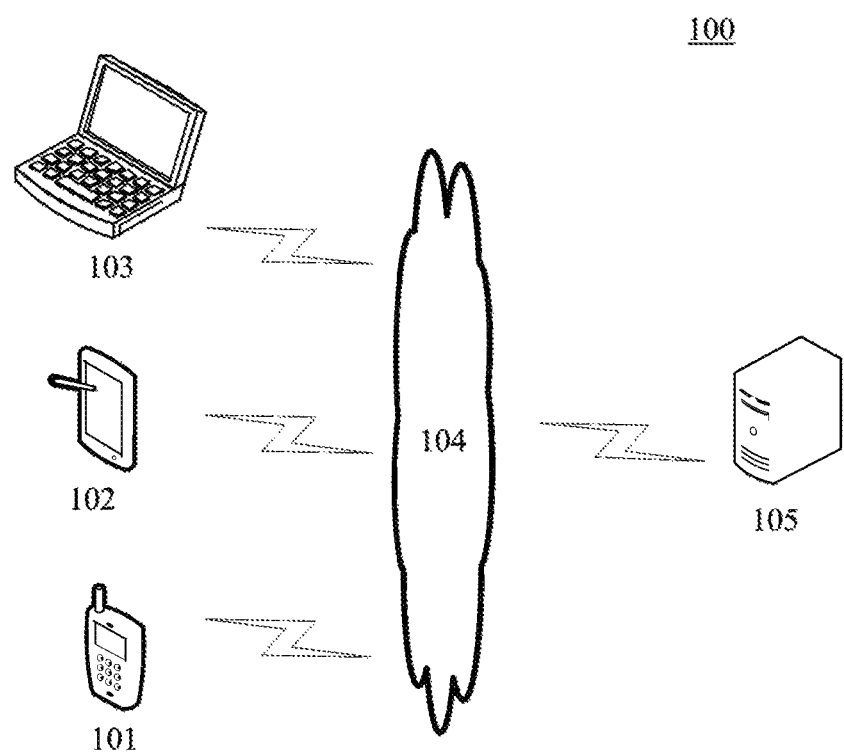
FIG. 1 is an illustrative system structure diagram where the disclosure may be applied.

FIG. 1 shows an exemplary architecture of a system 100 which may be used by a method or apparatus for generating a machine learning model according to the embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The terminal devices 101, 102 and 103 may interact with the server 105 through the network 104, in order to transmit or receive messages, etc. Various communication client applications, such as communications applications, web browser applications, search applications, and word processing applications may be installed on the terminal devices 101, 102 and 103.

The terminal devices 101, 102 and 103 may be various electronic devices having a display and supporting network communications, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may receive a request for generating a machine learning model from the terminal devices 101, 102 and 103, obtain validation scores after training and validating machine learning models corresponding to model parameter combinations, and then feed the validation scores back to the terminal devices, for the user to select a machine learning model corresponding to an optimal validation score.

It should be understood that the numbers of terminal devices, networks and servers in FIG. 1 are only indicative. Depending on the actual needs, any numbers of terminal devices, networks and servers may exist.

Figure 2:
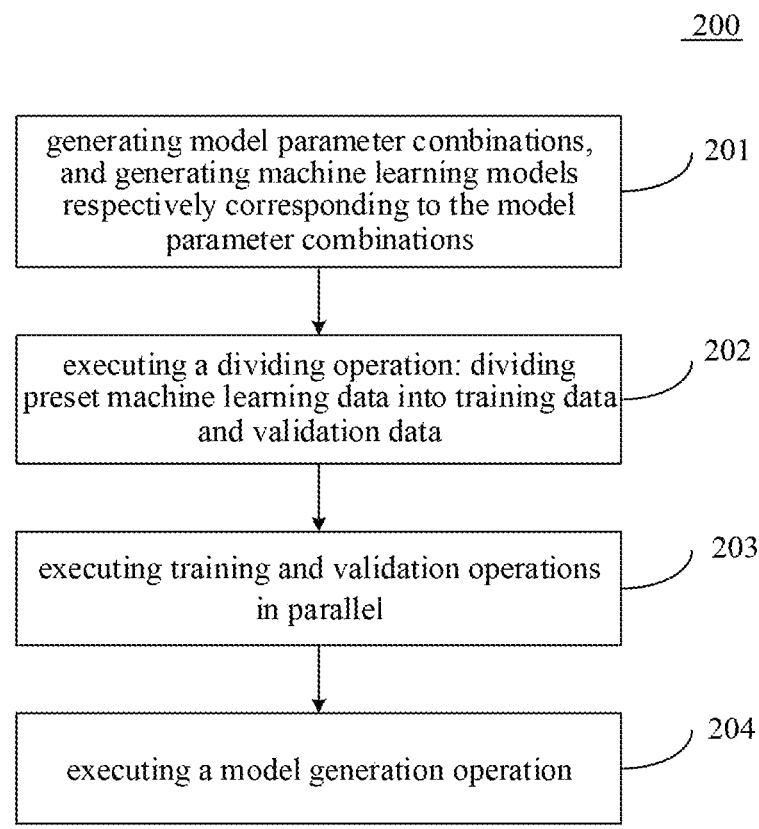
FIG. 2 is a flow diagram of an embodiment of a method for generating a machine learning model according to the disclosure.

Referring to FIG. 2, a flow process 200 of an embodiment of a method for generating a machine learning model according to this disclosure is shown. It should be noted that the method for generating a machine learning model provided by embodiments of this disclosure is generally executed by a server 105 in FIG. 1. The method includes the following steps:

Step 201, generating model parameter combinations, and generating machine learning models respectively corresponding to the model parameter combinations.

In this embodiment, model parameters indicate an associated relationship between input vectors and output vectors of the machine learning models. In this embodiment, a plurality of model parameter combinations may be generated. For example, a plurality of model parameter combinations are generated by adjusting parameter values of the model parameters. The model parameters of a machine learning model, e.g., an LDA model (Latent Dirichlet Allocation, a document topic generation model), include an $\alpha$ parameter, a $\beta$ parameter, an iteration number n, and a topic number K. Values of the $\alpha$ parameter and $\beta$ parameter may be adjusted to generate a plurality of model parameter combinations. For example, increasing the $\alpha$ parameter enables each document to be close to the same topic, and increasing the $\beta$ parameter enables each topic to be more focused on a few words.

Step 202, executing a dividing operation: dividing preset machine learning data into training data and validation data.

In this embodiment, preset machine learning data may be data of training the machine learning models, and may be divided into training data and validation data. The training data are used to train the machine learning models, and then the validation data are used to validate a learning effect of the trained machine learning models.

In some optional modes of implementing this embodiment, dividing preset machine learning data into training data and validation data includes: selecting a subset of the preset machine learning data from a plurality of preset subsets as the validation data, and using the preset machine learning data in other subsets as the training data, where the preset subsets are a plurality of sets containing an equal number of preset machine learning data obtained by dividing the preset machine learning data.

For example, the preset machine learning data are divided into N subsets, each of which contains an equal number of data. One subset thereof may be used as a test set, and the other N−1 subsets are used as training sets. Thus, N combinations may be generated, that is, in each combination, one subset thereof is used as the test set, and the other N−1 subsets are used as the training sets.

Step 203, executing training and validation operations in parallel.

In this embodiment, training and validation operations include: training the machine learning models respectively based on the training data; and validating a learning accuracy of the trained machine learning models respectively based on the validation data to obtain validation scores, where the validation scores indicate a ratio of consistency between data types corresponding to output vectors output by the machine leaning models based on the validation data and types of the validation data.

In this embodiment, the machine learning models may be trained respectively based on the training data; and a learning accuracy of the trained machine learning models is validated respectively based on the validation data to obtain validation scores. In other words, training and validation of the machine learning models are executed in parallel.

In some optional modes of implementing this embodiment, dividing operation and training and validation operations are all executed multiple times, the training data are training data divided by each dividing operation, and the validation data are validation data divided by the each dividing operation. Training the machine learning models in parallel respectively based on the training data includes:

training the machine learning models based on the training data divided by the each dividing operation; and validating a learning accuracy of the trained machine learning models respectively based on the validation data to obtain validation scores includes: validating a learning accuracy of the trained machine learning models respectively based on the validation data divided by the each dividing operation to obtain a plurality of validation scores.

In this embodiment, after dividing machine learning data into a plurality of subsets, the machine learning models corresponding to the model parameters may be trained and validated multiple times. During each training and validation of the machine learning models corresponding to the model parameters, the machine learning models corresponding to the model parameters are trained first using subsets as training sets. The machine learning models corresponding to the model parameters are then validated using a subset as a validation set to obtain validation scores. The validation scores may be used to indicate a ratio of consistency between data types corresponding to output vectors output by the machine leaning models based on the validation data and types of the validation data.

For example, the preset machine learning data are equally divided into N subsets, one subset is used as a test set, and the other N−1 subsets are used as training sets. Thus, N combinations may be generated, that is, in each combination, one subset is used as the test set, and the other N−1 subsets are used as the training sets. Training and validation operations of the machine learning models respectively corresponding to the model parameter combinations may be executed N times.

For a machine learning model corresponding to one model parameter combination, for instance, preset machine learning data are equally divided into 5 subsets. Training and validation operations of the machine learning model may be executed 5 times. In a first training and validation process of the machine learning model corresponding to the model parameters, a first subset may be used as a validation set, and the other four subsets are used as training sets. In a second training and validation process of the machine learning model corresponding to the model parameters, a second subset may be used as validation set and the other four subsets are used as training sets. Similarly, training and validation operations of the machine learning model corresponding to the model parameters are respectively executed 5 times to obtain 5 validation scores.

Step 204, executing a model generation operation.

In this embodiment, a model generation operation includes: determining an optimal model parameter combination corresponding to a machine learning model to be generated based on validation scores, and generating a machine learning model corresponding to the optimal model parameter combination.

Some optional modes of implementing this embodiment further include: executing training and validation operations using the Map task in the Map-Reduce model of a distributed computing framework such as the Apache™ Hadoop® software library, and executing a model generation operation using a Reduce task in the Map-Reduce model of the distributed computing framework Hadoop®.

In this embodiment, training and validation of the machine learning models may be executed using the Map-Reduce model of the Hadoop® distributed computing framework. The training and validation operations may be executed using the Map task in the Hadoop®, and a model generation operation may be executed using the Reduce task in the Hadoop®.

In some alternative modes of implementing this embodiment, determining an optimal model parameter combination corresponding to a machine learning model to be generated includes: calculating an average parameter value of a plurality of validation scores respectively corresponding to the machine learning models; using the average parameter value as reference model parameter value; and determining an optimal model parameter combination corresponding to the machine learning model to be generated based on the reference model parameter value.

In this embodiment, after training and validating machine models respectively corresponding to the model parameters multiple times, an average parameter value of a plurality of validation scores respectively corresponding to the machine learning models is calculated, and is used as a reference model parameter value. Then, an optimal model parameter combination corresponding to the machine learning model to be generated is determined based on the reference model parameter value. For example, when a user sends a request for generating machine learning models to a server through a terminal, and then trains and validates the machine learning models in parallel, the server returns the reference model parameter values, i.e., an average value of validation scores corresponding to the model parameter combinations, to the user terminal, and the user determines the optimal model parameter combination corresponding to the machine learning model to be generated according to the reference model parameter values.

Figure 3:
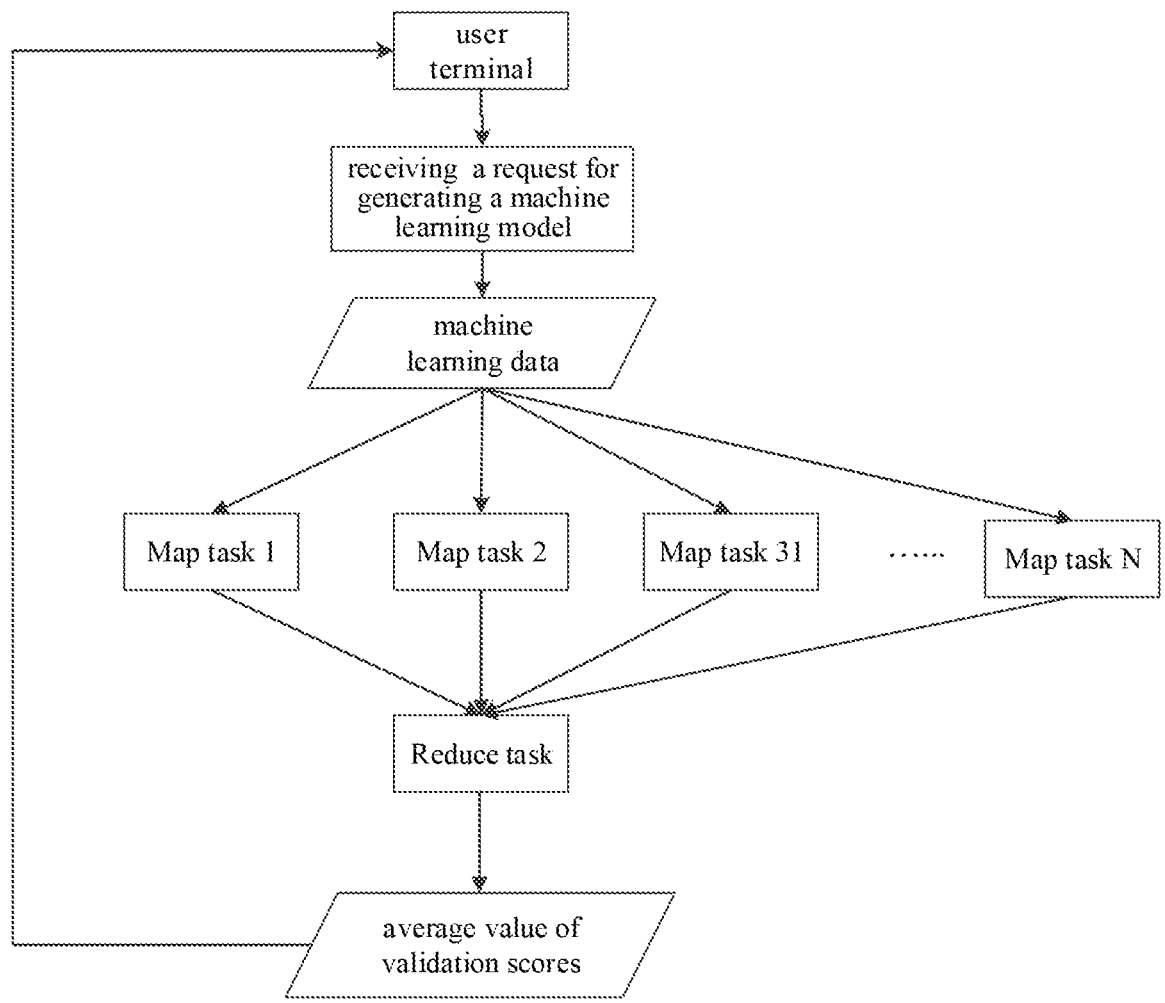
FIG. 3 is an illustrative schematic diagram of a method for generating a machine learning model according to the disclosure.

Referring to FIG. 3, an illustrative schematic diagram of a model generation method according to this disclosure is shown.

FIG. 3 shows a plurality of Map tasks and Reduce tasks for collecting validation scores obtained by executing the Map tasks. When a user (e.g., an engineer) first expects to obtain a machine learning model, such as an LDA model, the user may send a request for generating a machine learning model to a server using a terminal. The request for generating the machine learning model may contain scopes of machine learning model parameters, e.g., the scopes of α and β model parameters in the LDA model. After receiving the request for generating the machine learning model, the server may preprocess machine learning data (e.g., user consumption data) for training the LDA model and validating a learning effect of the trained LDA model, such as data cleaning. After preprocessing the machine learning data for training the LDA model and validating the learning effect of the trained LDA model, the machine learning data may be divided into a plurality of subsets, one of the subsets thereof is selected as a validation set, the other subsets are used as training sets, and the machine learning models respectively corresponding to the model parameters are validated and trained in parallel.

The machine learning models corresponding to the model parameters may be trained and validated using the MAP tasks. For the machine learning models respectively corresponding to the model parameters, a Map task is created for training and validation of the machine learning models corresponding to the model parameters. For example, each model parameter combination may be used as an input of the Hadoop®, training data may be uploaded to the Hadoop® as a cache file, and the machine learning models respectively corresponding to the model parameters are trained in parallel, so as to generate trained machine learning models respectively corresponding to the model parameter combinations. After training the machine learning models respectively corresponding to the model parameters in parallel, the trained machine learning models may be validated in parallel using validation data, thereby calculating a plurality of validation scores respectively corresponding to the model parameter combinations.

After training and validating the machine learning models respectively corresponding to the model parameter combinations, an average value of a plurality of validation scores respectively corresponding to the model parameter combinations may be calculated using the Reduce task, and is used as a reference model parameter value. Then, the reference model parameter values respectively corresponding to the model parameter combinations may be sent to a user terminal, so that a user may select a machine learning model corresponding to a model parameter combination of selected reference model parameter values according to the reference model parameter values.

The characteristics of the method for generating the machine learning model in the disclosure are described below:

First, the machine learning models respectively corresponding to the model parameter combinations are trained and validated in parallel using a Map task and a Reduce task in the Hodoop distributed system, thus quickly obtaining validation scores of the model parameter combinations, providing the validation scores to a user to enable the user to select a machine learning model corresponding to a desired model parameter combination, achieving the goal of searching for model parameter combinations completely in parallel, and improving a system execution efficiency.

Secondly, in the process of searching for an optimal model parameter combination and generating a machine learning model corresponding to the optimal parameter combination, the user only needs to input scopes of machine learning data and model parameters, so as to automatically complete the parameter searching process without manual intervention.

Figure 4:
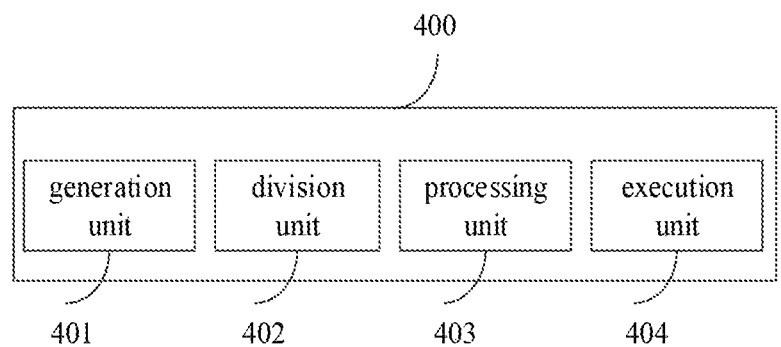
FIG. 4 is a structural diagram of an embodiment of an apparatus for generating a machine learning model according to the disclosure.

Referring to FIG. 4, a structural diagram of an embodiment of an apparatus for generating a machine learning model according to the disclosure is shown. The apparatus 400 includes: a generation unit 401, a division unit 402, a processing unit 403, and an execution unit 404, where the generation unit 401 is configured to generate model parameter combinations, and generate machine learning models respectively corresponding to the model parameter combinations, where the model parameters indicate an associated relationship between input vectors and output vectors of the machine learning models. The division unit 402 is configured to execute a dividing operation: dividing preset machine learning data into training data and validation data. The processing unit 403 is configured to execute training and validation operations: training the machine learning models in parallel respectively based on the training data; validating a learning accuracy of the trained machine learning models respectively based on the validation data to obtain validation scores, where the validation scores indicate a ratio of consistency between data types corresponding to output vectors output by the machine leaning models based on the validation data and types of the validation data. The execution unit 404 is configured to execute a model generation operation: determining an optimal model parameter combination corresponding to a machine learning model to be generated based on the validation scores, and generating a machine learning model corresponding to the optimal model parameter combination.

In some optional modes of implementing this embodiment, the apparatus 400 further includes: a distributed processing unit (not shown) configured to execute training and validation operations using a Map task in the Map-Reduce model of the Hadoop® distributed computing framework, and execute a model generation operation using a Reduce task in the Map-Reduce model of the Hadoop® distributed computing framework.

In some optional modes of implementing this embodiment, the division unit 402 includes: a selection subunit (not shown) configured to select a subset of preset machine learning data from a plurality of preset subsets as validation data, and using the preset machine learning data in other subsets as training data, where the preset subsets are a plurality of sets containing an equal number of preset machine learning data obtained by dividing the preset machine learning data.

In some optional modes of implementing this embodiment, dividing operation and training and validation operations are all executed multiple times, the training data are training data divided by each dividing operation, and the validation data are validation data divided by the each dividing operation. The processing unit 403 includes: a training subunit (not shown) configured to train machine learning models respectively based on the training data divided by the each dividing operation; and a validation subunit (not shown) configured to validate a learning accuracy of the trained machine learning models respectively based on the validation data divided by the each dividing operation to obtain a plurality of validation scores.

In some optional modes of implementing this embodiment, the execution unit 404 includes: a calculation subunit (not shown) configured to calculate an average parameter value of a plurality of validation scores respectively corresponding to the machine learning models; a setting subunit (not shown) configured to use the average parameter value as the reference model parameter value; and a parameter combination determination subunit (not shown) configured to determine an optimal model parameter combination corresponding to a machine learning model to be generated based on the reference model parameter value.

Figure 5:
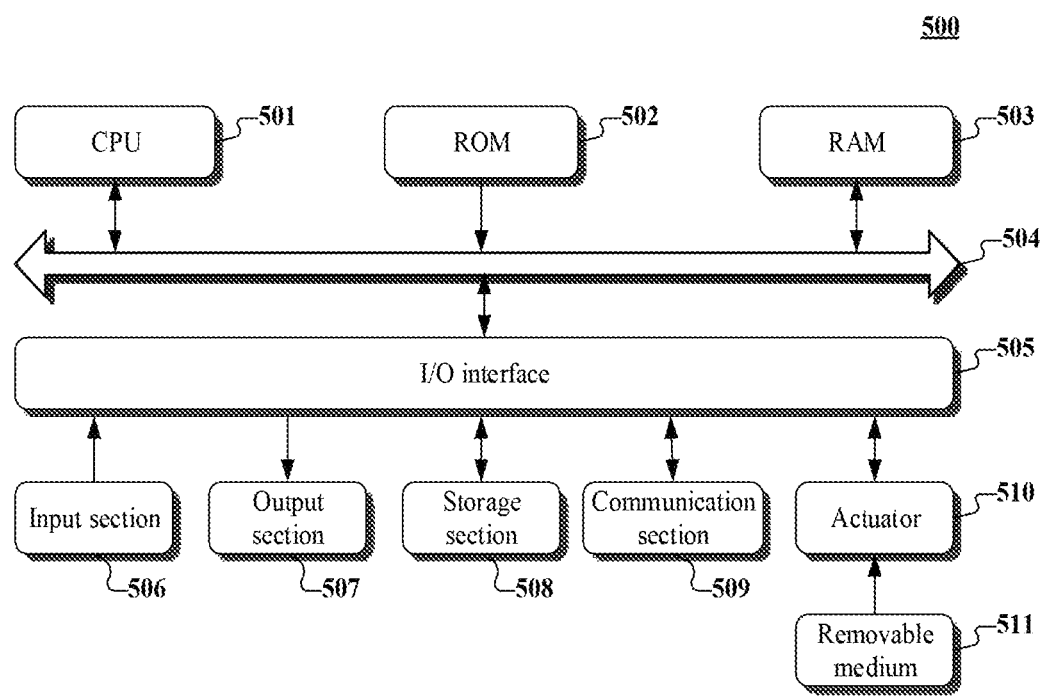
FIG. 5 is a structural diagram of a computer system of a terminal device or server applicable for realizing embodiments of the disclosure.

Referring to FIG. 5, a schematic structural diagram of a computer system 500 adapted to implement a terminal device or a server of the embodiments of the present disclosure is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

In another aspect, the present disclosure further provides a non-volatile computer-readable storage medium. The non-volatile computer-readable storage medium may be the non-volatile computer storage medium included in the apparatus in the above described embodiments, or a stand-alone non-volatile computer-readable storage medium not assembled into the apparatus. The non-volatile computer-readable storage medium stores one or more programs. The one or more programs, when executed by a device, cause the device to: generate model parameter combinations, and generate machine learning models respectively corresponding to the model parameter combinations, wherein the model parameters indicate an associated relationship between input vectors and output vectors of the machine learning models; execute a dividing operation: dividing preset machine learning data into training data and validation data; execute training and validation operations: training the machine learning models in parallel respectively based on the training data; validate a learning accuracy of the trained machine learning models respectively based on the validation data to obtain validation scores, wherein the validation scores indicate a ratio of consistency between data types corresponding to the output vectors output by the machine leaning models based on the validation data and types of the validation data; and execute a model generation operation: determining an optimal model parameter combination corresponding to a machine learning model to be generated based on the validation scores, and generating a machine learning model corresponding to the optimal model parameter combination.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for generating a machine learning model, the method comprising:
    generating a plurality of model parameter combinations, wherein in the plurality of model parameter combinations, values of model parameters in a model parameter combination are different from values of model parameters in another model parameter combination; and generating machine learning models respectively based on the plurality of model parameter combinations, each machine learning model being generated based on a model parameter combination, wherein the model parameters indicate an associated relationship between input vectors and output vectors of the machine learning models;
    executing a dividing operation: dividing preset machine learning data into training data and validation data;
    executing training and validation operations: training the machine learning models in parallel respectively based on the training data, wherein each of the machine learning models is trained with the training data; validating learning accuracies of the trained machine learning models in parallel respectively based on the validation data to obtain validation scores, wherein each validation score indicates a ratio of consistency between a data type corresponding to an output vector output based on a piece of validation data by each machine leaning model and a type of the piece of validation data, and
    executing a model generation operation: determining an optimal model parameter combination corresponding to a machine learning model to be generated based on the validation scores, and generating a machine learning model based on the optimal model parameter combination.

2. The method according to claim 1, the method further comprising:
    executing the training and validation operations using a Map task in a Map-Reduce model of a distributed computing framework, and executing the model generation operation using a Reduce task in the Map-Reduce model of the distributed computing framework.

3. The method according to claim 1, wherein the dividing preset machine leaning data into training data and validation data comprises:
    dividing the preset machine learning data into a plurality of subsets, wherein each of the plurality of subsets contains an equal number of preset machine learning data; and
    selecting a subset of the preset machine learning data from the plurality of subsets as the validation data, and using the preset machine learning data in other subsets as the training data.

4. The method according to claim 3, wherein the dividing operation and the training and validation operations are all executed multiple times, the training data are training data divided by each dividing operation, the validation data are validation data divided by each dividing operation; and the training the machine learning models in parallel respectively based on the training data comprises:
training the machine learning models based on the training data divided by each dividing operation; and
the validating the learning accuracy of the trained machine learning models respectively based on the validation data to obtain the validation scores comprises:
validating the learning accuracy of the trained machine learning models respectively based on the validation data divided by each dividing operation to obtain a plurality of validation scores.

5. The method according to claim 4, wherein the determining an optimal model parameter combination corresponding to a machine learning model to be generated based on the validation scores comprises:
calculating an average parameter value of a plurality of validation scores respectively corresponding to the machine learning models;
using the average parameter value as the reference model parameter value; and
determining the optimal model parameter combination corresponding to a machine learning model to be generated based on the reference model parameter value.

6. An apparatus for generating a machine learning model, the apparatus comprising:
a generation unit, configured to generate a plurality of model parameter combinations, wherein in the plurality of model parameter combinations, values of model parameters in a model parameter combination are different from values of model parameters in another model parameter combination; and generate machine learning models respectively based on the plurality of model parameter combinations, each machine learning model being generated based on a model parameter combination, wherein the model parameters indicate an associated relationship between input vectors and output vectors of the machine learning models;
a division unit, configured to execute a dividing operation: dividing preset machine learning data into training data and validation data;
a processing unit, configured to execute training and validation operations: training the machine learning models in parallel respectively based on the training data, wherein each of the machine learning models is trained with the training data; validating learning accuracies of the trained machine learning models in parallel respectively based on the validation data to obtain validation scores, wherein each validation score indicates a ratio of consistency between a data type corresponding to an output vectors output based on a piece of validation data by each machine leaning model and a type of the piece of validation data; and
an execution unit, configured to execute a model generation operation: determining an optimal model parameter combination based on a machine learning model to be generated based on the validation scores, and generating a machine learning model corresponding to the optimal model parameter combination.

7. The apparatus according to claim 6, the apparatus further comprising:
a distributed processing unit, configured to execute the training and validation operations using a Map task in a Map-Reduce model of a distributed computing framework, and executing the model generation operation using a Reduce task in the Map-Reduce model of the distributed computing framework.

8. The apparatus according to claim 6, wherein the division unit comprises:
a selection subunit, configured to divide the preset machine learning data into a plurality of subsets, wherein each of the plurality of subsets contains an equal number of preset machine learning data; and select a subset of the preset machine learning data from the plurality of subsets as the validation data, and use the preset machine learning data in other subsets as the training data.

9. The apparatus according to claim 8, wherein the dividing operation and the training and validation operations are all executed multiple times, the training data are training data divided by each dividing operation, and the validation data are validation data divided by each dividing operation; and the processing unit comprises:
a training subunit, configured to train the machine learning models based on the training data divided by the each dividing operation; and
a validation subunit, configured to validate the learning accuracy of the trained machine learning models respectively based on the validation data divided by the each dividing operation to obtain the validation scores.

10. The apparatus according to claim 9, wherein the execution unit comprises:
a calculation subunit, configured to calculate an average parameter value of a plurality of validation scores respectively corresponding to the machine learning models;
a setting subunit, configured to use the average parameter value as the reference model parameter value; and
a parameter combination determination subunit, configured to determine the optimal model parameter combination corresponding to a machine learning model to be generated based on the reference model parameter value.

11. An apparatus, comprising:
a processor; and
a memory,
wherein the memory stores computer readable instructions capable being executed by the processor, the processor executes a method for generating a machine learning model when the computer readable instructions are executed, and the method comprises:
generating a plurality of model parameter combinations, wherein in the plurality of model parameter combinations, values of model parameters in a model parameter combination are different from values of model parameters in another model parameter combination; and generating machine learning models respectively based on the plurality of model parameter combinations, each machine learning model being generated based on a model parameter combination, wherein the model parameters indicate an associated relationship between input vectors and output vectors of the machine learning models;
executing a dividing operation: dividing preset machine learning data into training data and validation data;
executing training and validation operations: training the machine learning models in parallel respectively based on the training data, wherein each of the machine learning models is trained with the training data; validating learning accuracies of the trained machine learning models in parallel respectively based on the validation data to obtain validation scores, wherein each validation scores indicates a ratio of consistency between a data type corresponding to an output vector output based on a piece of validation data by each machine leaning model and a type of the piece of validation data; and executing a model generation operation: determining an optimal model parameter combination corresponding to a machine learning model to be generated based on the validation scores, and generating a machine learning model based on the optimal model parameter combination.

\* \* \* \* \*